June 2, 1925.  1,539,975
P. TRIEFENBACH ET AL
VALVE FOR INTERNAL COMBUSTION ENGINES
Filed May 31, 1923    3 Sheets-Sheet 3
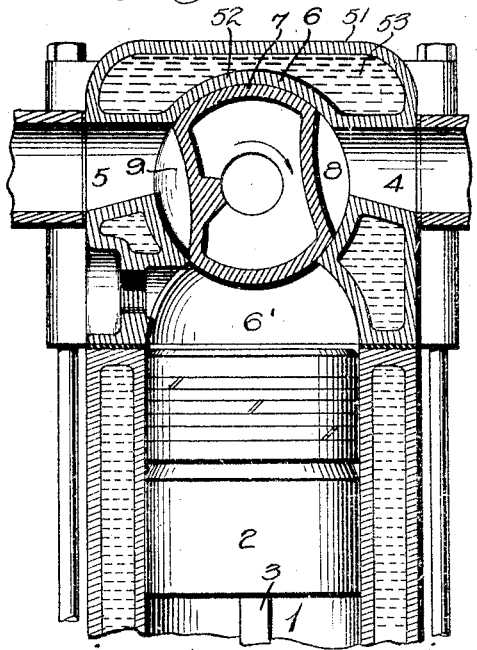
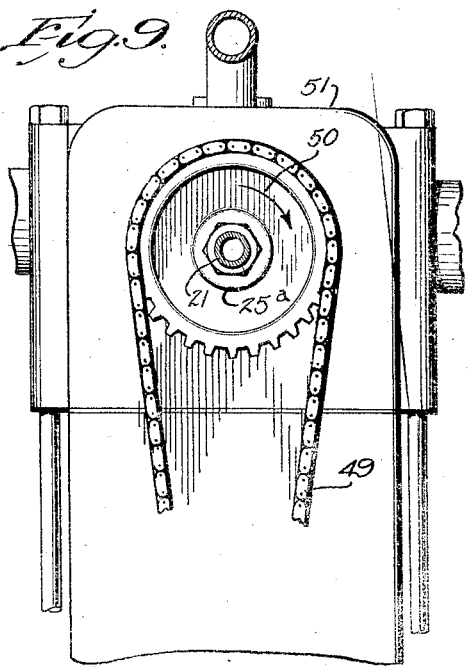
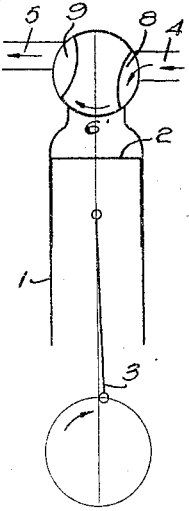
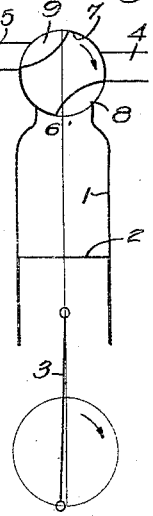
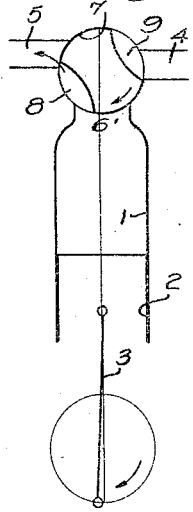
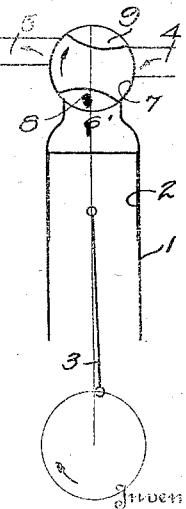
Inventors
PETER TRIEFENBACH
WILLIAM J. TRIEFENBACH
ALFRED P. TRIEFENBACH
GEORGE L. TRIEFENBACH
EDMUND A. РAMELOW
By
Attorney Patented June 2, 1925.

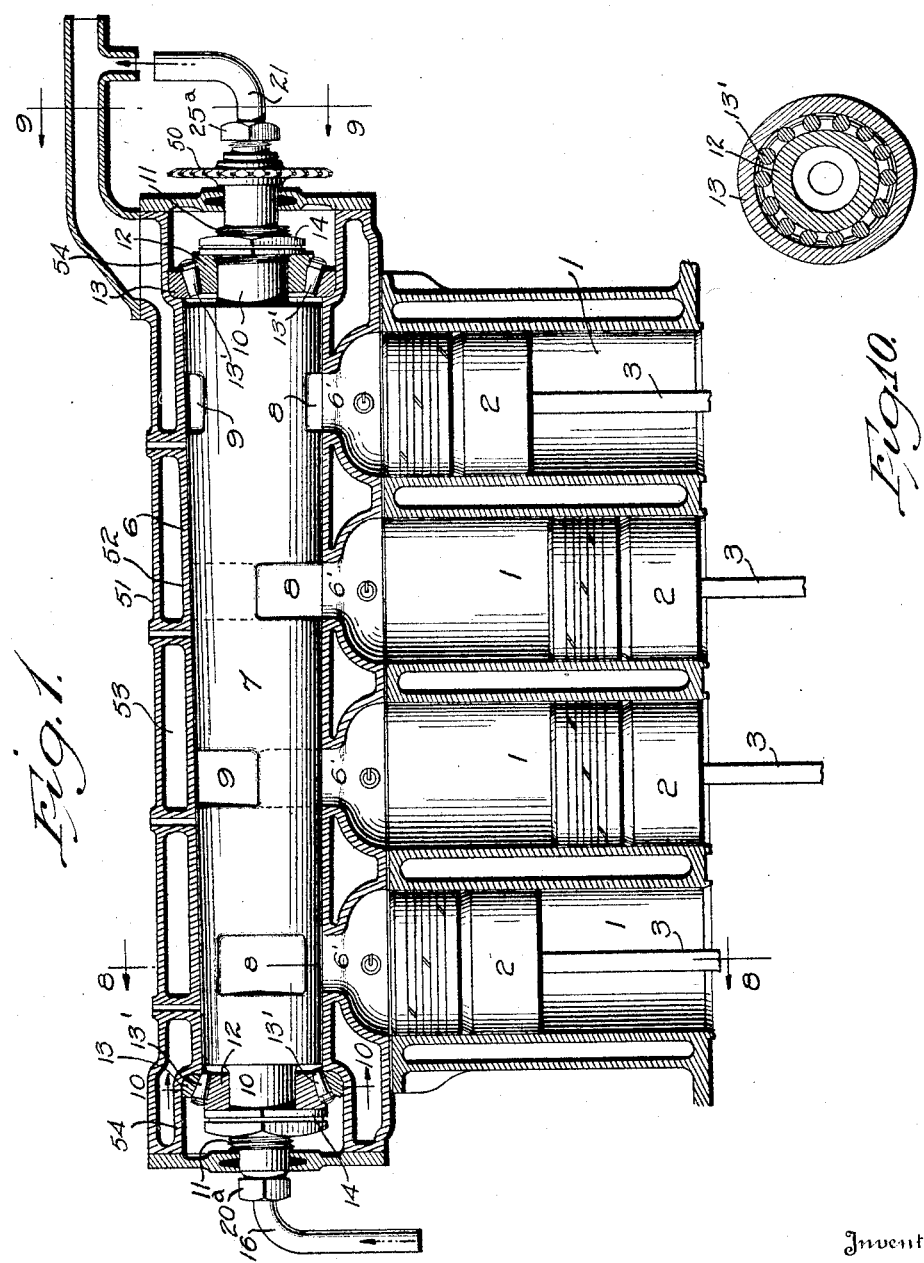

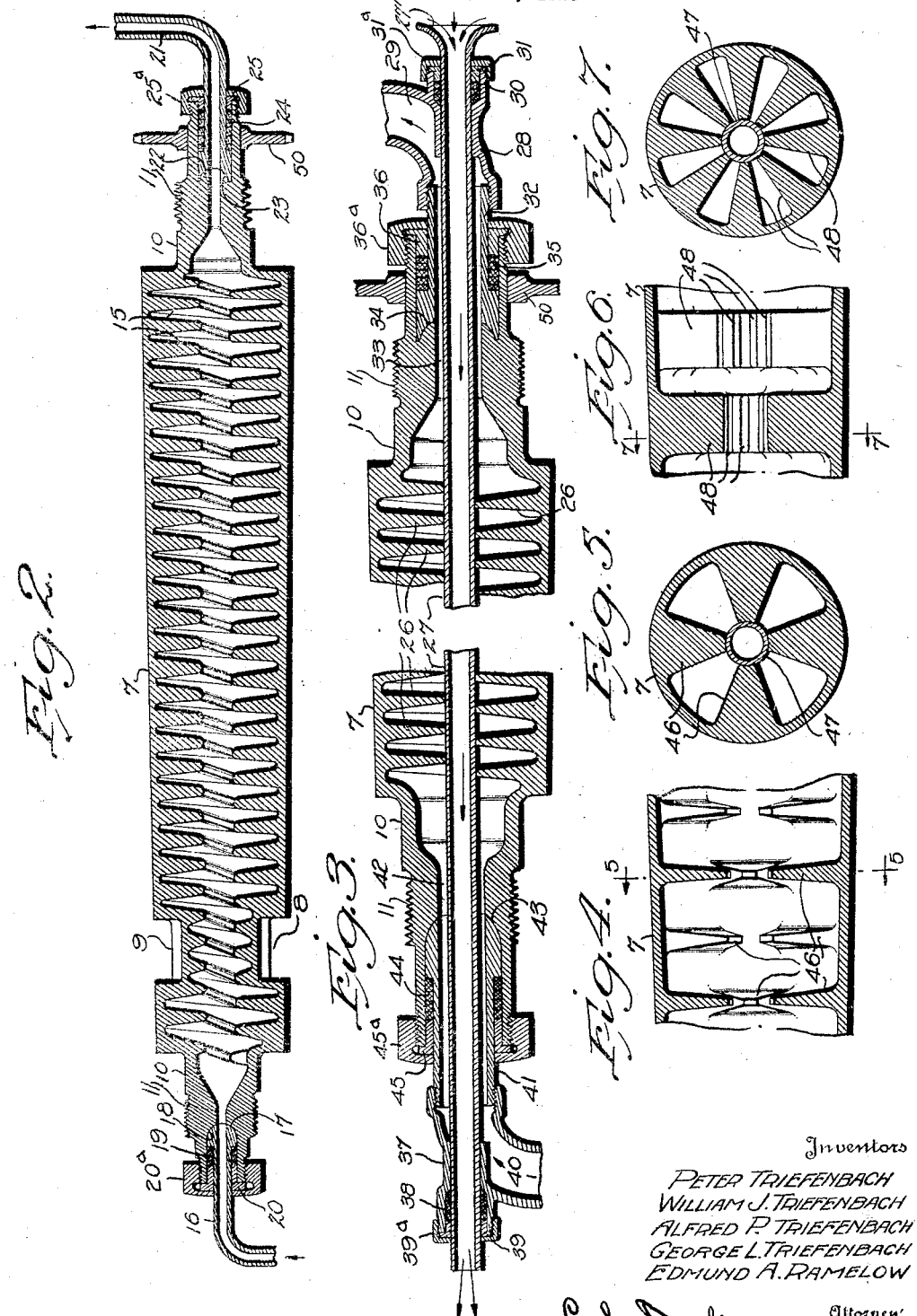

1,539,975

UNITED STATES PATENT OFFICE.

PETER TRIEFENBACH, WILLIAM J. TRIEFENBACH, ALFRED P. TRIEFENBACH, GEORGE L. TRIEFENBACH, AND EDMUND A. RAMELOW, OF ST. LOUIS, MISSOURI.

VALVE FOR INTERNAL-COMBUSTION ENGINES.

Application filed May 31, 1923. Serial No. 642,659.

*To all whom it may concern:*

Be it known that we, PETER TRIEFENBACH, WILLIAM J. TRIEFENBACH, ALFRED P. TRIEFENBACH, GEORGE L. TRIEFENBACH, and EDMUND A. RAMELOW, citizens of the United States, residing at the city of St. Louis and State of Missouri, have invented certain new and useful Improvements in Valves for Internal-Combustion Engines, of which the following is a specification.

This invention relates to valves for internal combustion engines, and more particularly to rotary valves.

An object of the invention is to provide a cylindrical valve having arcuate ports for the passage of gases to and from the cylinder or cylinders of an internal combustion engine and a hollow interior through which a cooling medium is adapted to be passed.

A further object of the invention is to provide a valve with greater cooling facilities than most types of puppet and rotary valves.

A further object of the invention is to provide a valve of minimum expansion.

A further object of the invention is to provide a valve of one piece construction, without compression head, compression members, packing rings, springs and other inserts common to most types of rotary and puppet valves.

A further object of the invention is to make water connections to and from the valve in such a manner as to eliminate leakage into engine cylinders.

A further object of the invention is to provide a valve so constructed as to permit a single valve member to perform the necessary functions for one or a multiple of cylinders.

A further object of the invention is to provide a valve of a diameter about equal of that of the cylinder bore.

A further object is the provision of a tapering valve member, and means for adjusting it in the valve chamber.

A further object of the invention is to provide a floating valve supported by bearings at each end.

A further object of the invention is to provide a valve so arranged to intake and exhaust twice during a complete revolution of the valve which is one half the speed common to most types of rotary and puppet valves.

A further object of the invention is the provision of a valve in which the exhaust gases passing from the cylinder exert a force on the valve member to assist in rotating it.

A further object of the invention is to provide a construction of valve whereby a more economical motor will be produced from the standpoint of manufacture.

The above objects and their accomplishments are obtained by means of the construction illustrated in the accompanying drawings and more fully described in the annexed specification. In this showing:

Figure 1 is a vertical longitudinal sectional view of a multi-cylinder engine showing the invention applied, Figure 2 is a longitudinal sectional view of the valve shown in Figure 1, wherein water or other liquid is employed as a cooling medium, Figure 3 is a similar view of a modified type of valve in which water and air are both employed as cooling mediums, Figure 4 is a detail longitudinal sectional view of another form of valve, Figure 5 is a transverse sectional view on line 5—5 of Figure 4, Figure 6 is a detail longitudinal sectional view of another form of valve, Figure 7 is a transverse sectional view on line 7—7 of Figure 6, Figure 8 is a transverse sectional view on line 8—8 of Figure 1, Figure 9 is a similar view on line 9—9 of Figure 1, Figure 10 is a detail sectional view on line 10—10 of Figure 1, and, Figures 11, 12, 13, and 14 are diagrammatic views of the four stroke cycles of an engine cylinder showing the piston in its different positions, and also showing the valve ports.

Referring to the drawings, Figures 1 and 8, the engine cylinders, of which four are shown for purposes of illustration, are designated by the reference numeral 1. These cylinders are provided with pistons 2, arranged therein in the usual manner. The pistons are provided with connecting rods 3, adapted to be connected to the crank shaft in the usual manner. Arranged lengthwise above the cylinders is a valve chamber 6. The valve chamber is provided with inlet openings 4 and exhaust openings 5. These openings communicate with the cylinders by means of the port openings 6'. A valve 7 is disposed in this chamber and forms a substantially tight fit therein. As shown, the valve and valve chamber taper longitudinally. The valve is provided with a plurality of arcuate depressions 8 and 9, arranged in pairs in alinement with the cylinders of the engine and staggered with respect to each other. These depressions communicate with the cylinders of the engine through port openings 6', whereby the various cylinders of the engine will be in different parts of a cycle of operation at any given time, as is usual, in multi-cylinder internal combustion engines.

In the form of the invention shown in Figures 1 and 8, the diameter of the valve, with reference to the bore of cylinders, shows the valve to be about equal in diameter to that of the cylinder bore.

The valve is provided with reduced ends 10, having threaded portions 11 of slightly less diameter so as to allow bearing rings 12 to be received on reduced ends. Similar rings 13 of larger diameter are mounted in the valve chamber bearing housings, said rings are adapted to receive the smaller bearing rings. Tapered rollers 13' are arranged between these rings forming the taper roller bearings which support the valve at each end. Suitable adjusting lock nuts 14 are arranged on the threaded portions 11 to retain the parts of the bearings in position and to adjust the valve for clearance within the valve chamber, providing a valve of floating construction.

In the form of the invention shown in Figure 2 of the drawings, the interior of the valve is provided with spiral fins 15. The construction of the fins as shown in Figure 2 are heavier at the bottom or outer face of the valve and taper to a point toward the center of the valve. By being thus constructed, greater cooling surface is obtained for the valve, a minimum of weight and a maximum of strength. These fins serve to take up expansion due to the excessive heat to which the valve is subjected. The fins in turn radiate the heat which is taken up by the water or other cooling medium passing through the valve. This water or other fluid is delivered by a suitable pump (not shown) through a stationary fitting 16 which enters one end of the valve. The spiral fin arrangement may be adapted to form a propeller or screw feed for water or other fluid used as a cooling medium. As shown, an opening within the valve is provided with a concaved depression 17, adapted to receive a convexed face 18 on the end of the fitting. Suitable packing 19 is arranged between the fitting and the opening in the end of the valve member, followed by a metallic packing gland 20, and a packing nut 20ª retains this gland and packing in position. The water passes from the valve through a stationary fitting 21, the end of which is provided with a concave depression 22, adapted to be received on a convexed face 23 in the end of the valve opening. Suitable packing 24 is arranged between the fitting and the opening in the end of the valve member, followed by a metallic packing gland 25, and a packing nut 25ª retains this gland and packing in position.

In the form of the invention shown in Figure 3 of the drawings, the valve is provided with spirally arranged fins 26 substantially similar to the spiral fins 15 shown in Figure 2. The spirally arranged fins 26 perform the same functions as the spiral fins 15, as described in Figure 2. A tube 27 is arranged through the center of the valve and this tube is adapted to convey air or other gaseous medium for additional cooling of the valve. The air tube is provided with a flared out or bell-shaped end 27', to gather and direct the flow of air or other gaseous medium through the tube. The air tube is stationary and passes through a special fitting 28 at one end, said fitting being provided with a branch 29 adapted to be connected to a fluid outlet pipe. The air tube is surrounded in the fitting by a suitable packing 30, followed by a metallic packing gland 31, and a packing nut 31ª retains this gland and packing in position. The inner end of special fitting 28 is connected to another fitting 32, received within a bore 33, formed in the end of the valve. This fitting is provided with a concaved depression 34, on its inner face, adapted to receive a convexed or ball shaped head formed in the bore of the valve member. It is surrounded in the valve by suitable packing 35, followed by a metallic packing gland 36, and a packing nut 36ª retains the packing gland and packing in position. The construction at the air outlet end is substantially the same as the air inlet end. A fitting 37 is provided through which the air tube passes. Adjacent the point where the air tube extends from the fitting, there is provided suitable packing 38, followed by a metallic packing gland 39 retained in position by a packing nut 39ª. The fitting is provided with a branch 40 arranged at an angle and adapted to be connected to a suitable pipe or other conduit through which the intake water passes. The inner end of the fitting 37 is connected to a fitting 41, received within a bore 42 in the end of the valve. This fitting is provided with a convexed end 43, received in a concaved depression in the bore within the end of the valve. Suitable packing 44 is arranged around the fitting, followed by a metallic packing gland 45, and retained in position by a packing nut 45ᵃ.

In the form of the invention shown in Figures 4 and 5 of the drawings, the spiral fins are replaced by inwardly projecting lugs 46. These lugs are arranged in series longitudinally with the valve and in staggered relation to each other, as shown in Figure 4. The object in staggering these lugs is to retard the flow of water or other cooling medium in the valve so as to cause it to come in contact with the heated surfaces of the lugs. When water and air are both used as cooling mediums, an air tube 47 is arranged centrally of the valve. The fittings and connections on said air tube are identical to those described in Figure 3.

In the form of the invention shown in Figures 6 and 7 of the drawings, lugs 48 are employed and arranged in series longitudinally with the valve and in staggered relation to each other, as shown in Figure 6. These lugs differ from lugs shown in Figure 4, in that they extend longitudinally of the valve. The object in staggering these lugs is identical to those described in Figures 4 and 5. When water and air are both used as cooling mediums, the air tube 47 is arranged centrally of the valve. The fittings and connections on said air tube are identical to those described in Figure 3.

Figure 9 is an end view of the engine showing one means of driving the valve. In this particular drive, the valve is rotated from the crank shaft by means of a driving chain 49 passing over a sprocket (not shown) on the crank shaft and a sprocket 50 carried by the valve. The valve rotates at one-fourth the speed of the crank shaft, whereby the valve makes one-half a revolution to two complete revolutions of the crank shaft or four strokes of the piston. The same result may be accomplished by connecting the said valve and crank shaft with suitable gearing or worm drive.

In Figures 11, 12, 13, and 14 of the drawings, we have diagrammatically illustrated the four stroke cycles of a piston of an engine cylinder showing the positions of the piston in the cylinder with reference to the port openings in the valve. The four stroke cycles being the intake, compression, firing and exhaust.

In Figure 11, the piston is about to start its downward or gas intake stroke and the intake port 4 is about to be placed in communication with the cylinder port opening 6′ through the valve port 8. The valve is traveling in a clockwise direction and upon further movement, the valve port 8 will be in communication with intake opening 4 and cylinder port opening 6′ permitting a charge of gas to be drawn into the cylinder on the downward stroke of the piston. At the end of this stroke, the ports will be in the position shown in Figure 12. The valve port 8 will then be out of communication with intake opening 4 and as the exhaust opening 5 is not in communication with the interior of the cylinder, the upward movement of the piston will compress the charge of gas in the usual manner, as shown in Figure 13. During the next stroke, the piston moves downwardly and at the beginning of the stroke, the valve will be in the position shown in Figure 13. Both the valve ports 8 and 9 are out of communication with the inlet opening 4 and exhaust opening 5 so that there is no flow of gas either into or out of the cylinder. Just before the beginning of this stroke, the gas is fired in the usual manner and the power of the exploded gas forces the piston downwardly in the usual manner. At the end of the stroke the piston is in the lowered position and the valve ports are in the position shown in Figure 14. Valve port 8 is about to come in communication with the exhaust opening 5 and is still in communication with the cylinder. The valve port 8 remains in communication with the exhaust opening 5 and is still in communication with the cylinder. The valve port 8 remains in communication with the exhaust opening 5 and cylinder during the upward movement of the piston, and thus the burned gases are discharged from the cylinder. At the end of this stroke, the valve port 9 will be in the position of valve port 8 in Figure 11 and during the next cycle of the engine, the valve port 9 functions to permit communication between the cylinder and the exhaust and inlet openings. It will be noted that the valve makes half a revolution to each complete cycle or two revolutions of the crank shaft.

Referring to Figures 1 and 8 of the drawings, the valve member is mounted in a valve cylinder head 51. The openings 4 and 5 and cylinder port openings 6′ extend through this head and are of a size so arranged and spaced to give proper timing for the valve. The valve cylinder head is composed of inner walls 52, forming a chamber to receive the rotary valve. The outer wall conforms to the size and shape of the cylinders, as shown in Figure 8. The hollow space 53 between these two walls forms a cooling space and is adapted to receive water or other cooling medium. The valve cylinder head is also provided with enlarged ends 54, outside the valve chamber, adapted to receive the outer bearing rings and form the rotary valve bearing housings. These enlarged ends have inner and outer walls with cooling space between.

The valve cylinder head is rigidly secured and held in place on the engine cylinders by means of bolts or any other suitable method. The head can be so arranged to receive its water or other cooling medium from the cylinder water jacket, or it can be supplied independent directly from the pump. The head is also provided with a suitable outlet to the radiator. The cylinder port opening and the concave depression directly above the cylinders, forms the cylinder combustion chamber.

It is to be understood that the forms of our invention herewith shown and described are to be taken as preferred examples of the same, and that various changes in the shape, size, and arrangement of parts may be resorted to without departing from the spirit of the invention or the scope of the subjoined claims.

Having thus described our invention, we claim:

1. In a device of the character described, a valve chamber, a rotary valve arranged therein, means for rotating said valve, means for delivering a cooling fluid to the interior of said valve, reinforcing fins spirally arranged on the interior of said valve said reinforcing fins being adapted to take up the heat and radiate it to said cooling fluid passing through said valve, means for discharging said fluid from said valve and an air pipe arranged within said valve.

2. In a device of the character described, a valve chamber, a rotating hollow valve member arranged therein, means for delivering a cooling fluid to the interior of said valve member, reinforcing fins spirally arranged on the interior of said valve member, means for discharging said fluid from said valve member, and a centrally disposed tube through which air or other gaseous medium is adapted to be passed for additional cooling of said valve member.

3. In a device of the character described, a valve chamber, a rotating hollow valve member arranged therein, means for delivering a cooling fluid to the interior of said valve member, inwardly projecting lugs in staggered formation arranged on the interior of said valve member, means for discharging said fluid from said valve member, and a centrally disposed tube arranged in said valve member for the passage of a cooling medium for additional cooling of said valve member.

In testimony whereof, we affix our signatures in presence of two witnesses.

PETER TRIEFENBACH.
WILLIAM J. TRIEFENBACH.
ALFRED P. TRIEFENBACH.
GEORGE L. TRIEFENBACH.
EDMUND A. RAMELOW.

Witnesses:
 JOHN H. E. LINHARDT,
 W. L. FAHRENHOLZ.